No. 768,877. PATENTED AUG. 30, 1904.
T. J. GRIFFIN.
COTTON COMPRESS.
APPLICATION FILED JAN. 14, 1896. RENEWED NOV. 7, 1900.
NO MODEL. 3 SHEETS—SHEET 1.
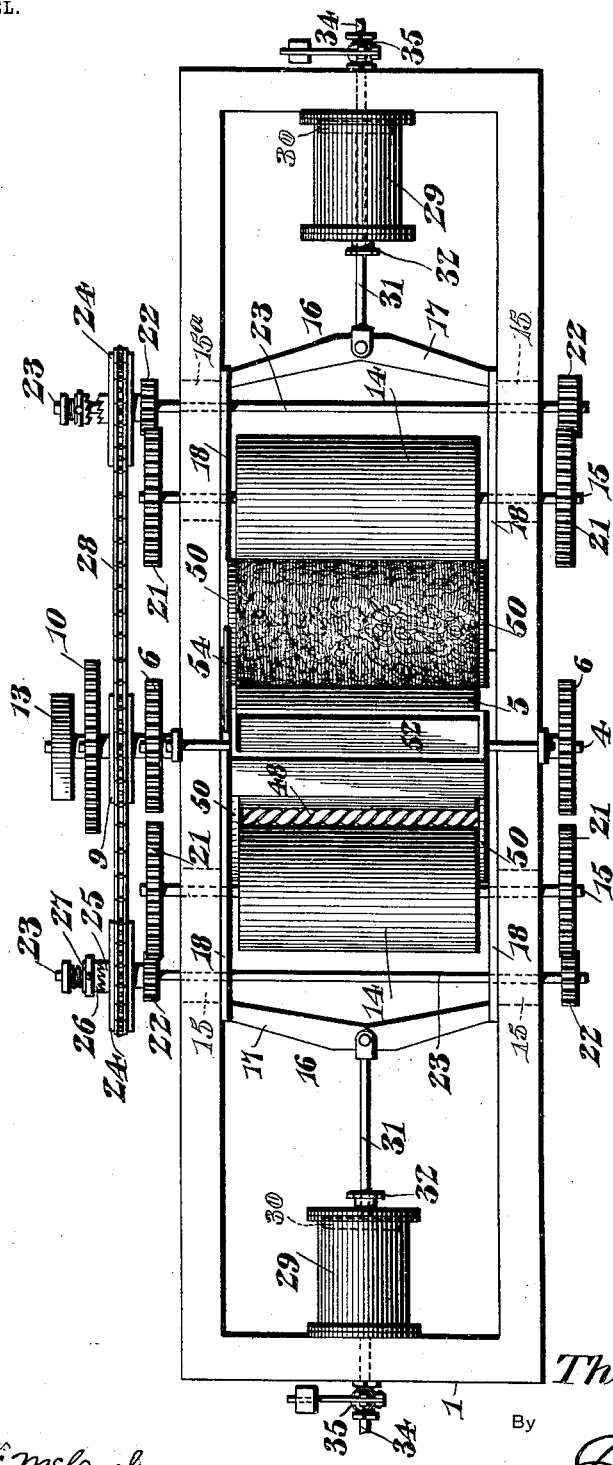
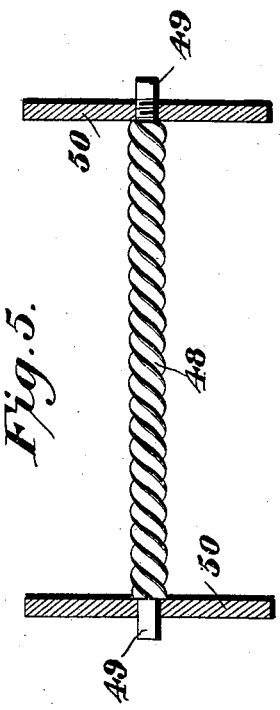

No. 768,877. PATENTED AUG. 30, 1904.
T. J. GRIFFIN.
COTTON COMPRESS.
APPLICATION FILED JAN. 14, 1896. RENEWED NOV. 7, 1900.
NO MODEL. 3 SHEETS—SHEET 2.
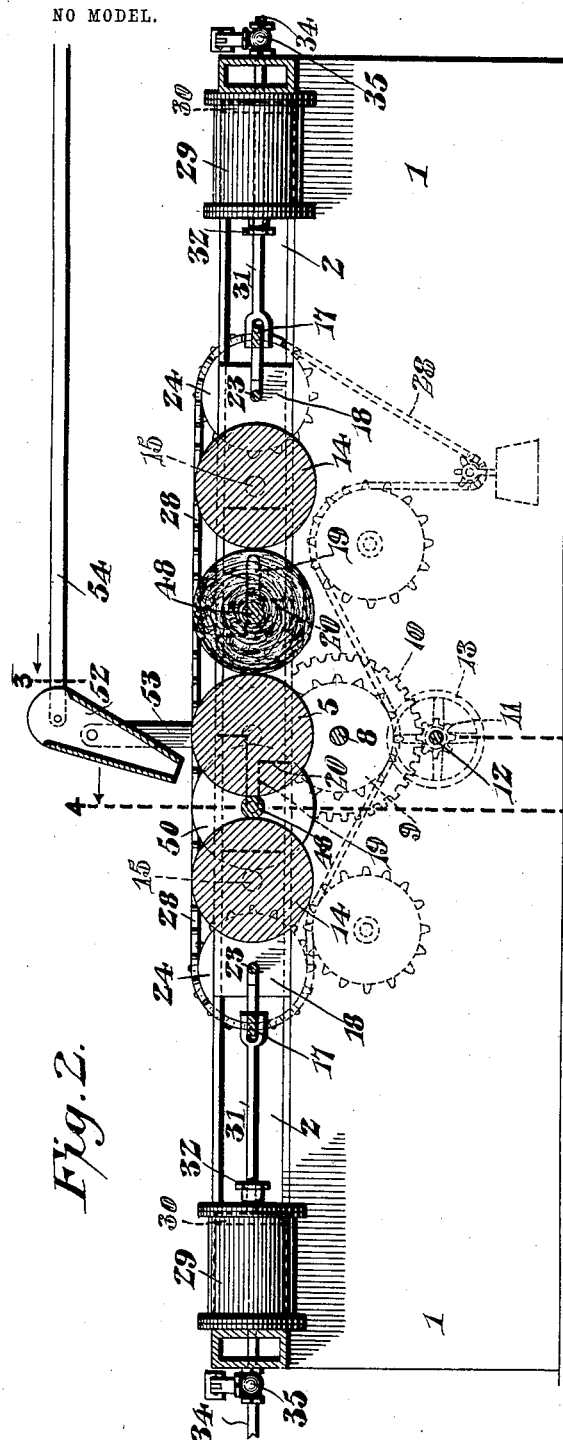
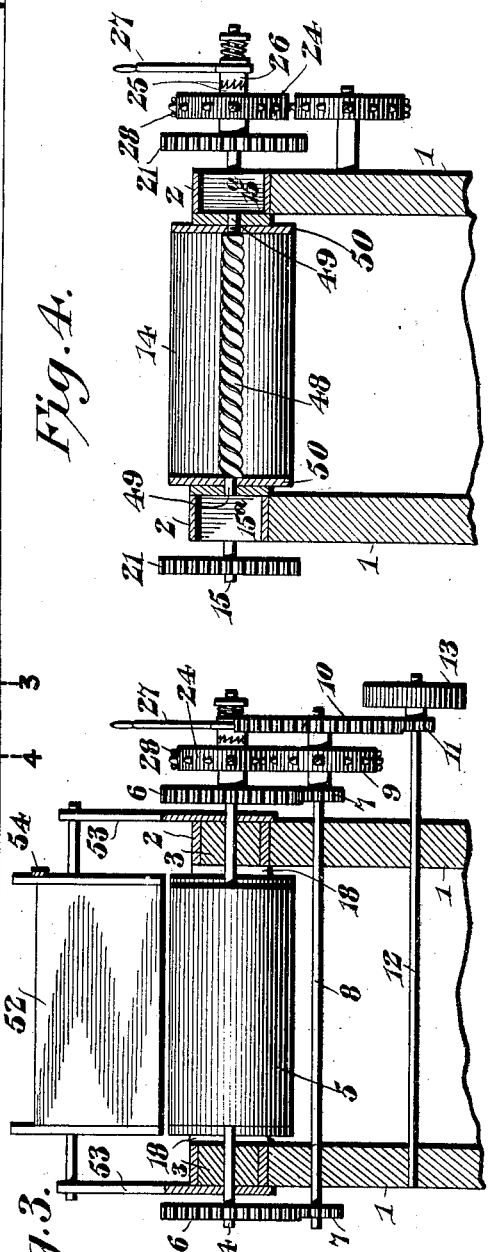
Thomas J. Griffin, Inventor No. 768,877. PATENTED AUG. 30, 1904.
T. J. GRIFFIN.
COTTON COMPRESS.
APPLICATION FILED JAN. 14, 1896. RENEWED NOV. 7, 1900.
NO MODEL. 3 SHEETS—SHEET 3.
Fig. 6.
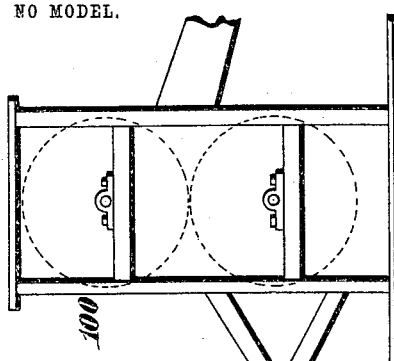
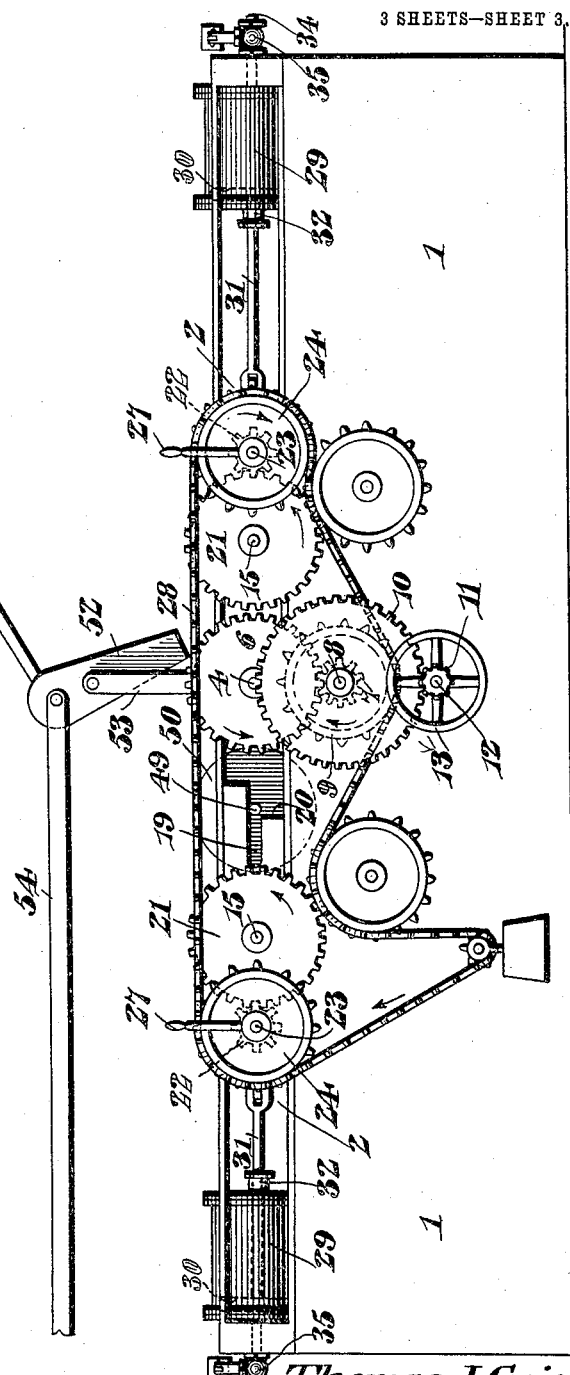
Witnesses
Jas. K. McCathran
D. T. Stalhampter
Thomas J. Griffin
Inventor
By E. G. Siggers
Attorney No. 768,877. Patented August 30, 1904.

UNITED STATES PATENT OFFICE.

THOMAS J. GRIFFIN, OF GALVESTON, TEXAS, ASSIGNOR, BY DIRECT AND MESNE ASSIGNMENTS, TO HARMON RIEDEL, EDWARD McCARTHY, AND NICHOLAS WEEKS, OF GALVESTON, TEXAS, CHESTER A. SNOW AND EDWARD G. SIGGERS, OF WASHINGTON, DISTRICT OF COLUMBIA, AND THE AMERICAN COTTON COMPANY, OF NEW YORK, N. Y., A CORPORATION OF NEW JERSEY.

COTTON-COMPRESS.

SPECIFICATION forming part of Letters Patent No. 768,877, dated August 30, 1904.

Application filed January 14, 1896. Renewed November 7, 1900. Serial No. 35,770. (No model.)

*To all whom it may concern:*

Be it known that I, THOMAS J. GRIFFIN, a citizen of the United States, residing at Galveston, in the county of Galveston and State of Texas, have invented a new and useful Cotton-Compress, of which the following is a specification.

This invention relates to cotton-compresses; and it has for its object to effect certain improvements in cotton-compresses of that character commonly known as "roller-compresses" which form a cylindrical or round bale.

To this end the main and primary object of the present invention is to provide improved means for forming a cylindrical or roll bale of cotton at the ginnery without stopping or in any way interfering with the full output of the gins; and in the accomplishment of this result the invention contemplates a continuous operation whereby one bale of cotton is being formed by the compress all the time the machine is working, which operation has heretofore been impossible in presses employing only one pair of compressing-rolls, in which presses it is necessary to completely stop the entire operation of the press for every single bale made until the bale can be wrapped and discharged out of the press, which operation involves such a considerable loss of time as to be very objectionable.

With these and other objects in view, which will readily appear as the nature of the invention is better understood, the same consists in the novel construction, combination, and arrangement of parts hereinafter more fully described, illustrated, and claimed.

The improvements contemplated by the present invention for carrying out a continuous operation of baling cylindrical bales in cotton are applicable to any duplex arrangement of pressing appliances or any type of press involving two sets of rotary pressing appliances.

In the drawings, Figure 1 is a top plan view of one type of cotton-compress with which the invention may be associated. Fig. 2 is a central vertical longitudinal sectional view thereof. Fig. 3 is a transverse sectional view on the line 3 3 of Fig. 2. Fig. 4 is a similar view on the line 4 4 of Fig. 2. Fig. 5 is an enlarged detail view, partly in section, of one of the core-rods for the roll bale. Fig. 6 is a side elevation of the press, exposing the arrangement of the driving-chain and showing the relation of the condenser to the feed-chute.

Like reference-numerals designate like parts in the several figures of the drawings.

In carrying out the present invention it is immaterial as to what particular construction of press or pressing appliances are used providing such press or appliances include two sets of rotary pressing appliances which are alternately brought into action by reason of having associated therewith the essential feature of the present application—namely, means for feeding the bat to either of said appliances and for shifting the feed from either one to the other, whereby the process of forming a bale in either one may go on while a previously-finished bale is being removed from the other. For the purpose of illustrating this novel combination in a cotton-compress the improvements are shown in the drawings applied to a press of the three-roll type, which press necessarily involves two sets of rotary pressing appliances. In order that the application of the invention may be fully understood, a detailed description of this press and its appurtenances will now be given.

The numeral 1 designates the base-frame of the press, which is arranged on a floor or bed conveniently adjacent to the condenser from which the lint cotton is fed to the press for the purpose of being formed into the cylindrical or roll bales. The base-frame 1 is provided at the opposite upper sides with horizontal slotted ways 2, and arranged at a central point between the opposite ends of the frame 1 are the central oppositely-located fixed bearing-boxes 3, mounted, respectively, at opposite sides of the frame and having journaled therein the shaft extremities 4 of the central fixed rotating compressing-roll 5, which forms the positive roll of the press and has a constant fixed rotation in one direction. The opposite shaft extremities 4 of the central fixed compression-roll 5 have mounted thereon, outside of the frame 1, the gear-wheels 6, with which gear-wheels mesh the drive-pinions 7, arranged therebelow and mounted on opposite ends of a counter-shaft 8, journaled in opposite sides of the frame 1 below the central compressing-roll 5. One extremity of the counter-shaft 8 has mounted thereon in addition to the pinion 7 a chain-wheel 9 and a spur-wheel 10, which latter wheel meshes with a driving-pinion 11, mounted on a drive-shaft 12, journaled in the frame 1 and carrying at one end a belt-pulley 13, which receives the belt for transmitting motion to the working parts of the press.

Arranged at each side of the central fixed compressing-roll 5 and working within the frame 1 is a horizontally-movable rotary compressing-roll 14, movable toward and away from the roll 5 and rotating in the same direction and at the same peripheral rate of speed as the said roll 5. The horizontally-movable rolls 14 are designed to move horizontally, simultaneously, and in the same direction and are alternately operated, in conjunction with the roll 5, to provide for continuously forming one bale within the press during the operation thereof, and by reason of the alternate use of the rolls 14 it will be obvious that when one roll is in its nearest position to the central fixed roll 5 the other roll 14 is in its position farthest from the said roll 5, as clearly illustrated in Figs. 1 and 2 of the drawings.

Each of the horizontally-movable compressing-rolls 14, which form the negative rolls of the press, has its opposite shaft extremities 15, mounted in the double boxings $15^a$, arranged to slide horizontally in the slotted ways 2 of the base-frame and carried by and at opposite sides of a horizontally-movable roll-carrying yoke 16. Each roll-carrying yoke 16 essentially consists of a transverse cross-bar 17 and opposite side yoke-plates 18, sliding at opposite inner sides of the base-frame 1. The opposite side yoke-plates 18 of each roll-carrying yoke 16 project beyond the inner side of the roll carried by such yoke and are provided within such projecting portions with the horizontally-disposed core-supporting slots 19, and at the inner terminals of said slots 19 and at the lower sides thereof the side yoke-plates 18 are shortened or cut away, as at 20, to form core-clearance spaces, for the purpose to be hereinafter more particularly referred to.

The opposite shaft extremities 15 of each negative compressing-roll 14 have mounted thereon the gear-wheels 21, which mesh with the pinions 22, arranged directly at one side thereof and mounted at opposite ends of a counter-shaft 23, which shaft extends transversely across the frame and is journaled in the double bearing-boxes $15^a$, carried by the yoke 16. Each of the oppositely-located counter-shafts 23 carries upon one end a loose sprocket-wheel 24, provided at one side with a clutch-hub 25, normally engaged by a clutch-collar 26, feathered on the shaft 23 and controlled by means of the lever 27, suitably connected therewith, whereby the collar 26 may be readily thrown in and out of engagement with the clutch member or hub carried by the sprocket-wheel 24. A single endless drive-chain 28 is employed in connection with the counter-shafts for the opposite movable compressing-rolls 14, and said drive-chain 28 passes around the oppositely-located sprocket-wheels 24 and also engages with the chain-wheel 9, which chain-wheel provides means, through the medium of the chain 28, for positively communicating motion to the counter-shafts 23 and in turn to the horizontally-movable rolls 14. At this point it is to be observed that the chain-wheels 24 and 9, the pinions 22 and 7, and the gear-wheels 21 and 6 are all of the same size to provide for rotating all of the compressing-rolls at the same peripheral rate of speed. The manner of arranging the chain 28 provides for the rotation of all of said rolls in the same direction; but it will be understood that it is not important to the present invention how this result is attained, as any kind of gearing or driving devices may be utilized to secure the rotation of the several compressing-rolls in the same direction and at the same peripheral rate of speed.

In carrying out the present invention it is immaterial what type of pressure mechanism is associated with the movable compression-rolls 14, as it is only necessary to combine with these rolls such mechanism as will provide for holding the same under pressure against the growing bale to resist the growth of the latter, whereby the desired density of compression will be secured. I have therefore deemed it unnecessary to illustrate any special type of pressure mechanism in connection with the movable rolls 14 and for illustrative purposes only show an old and well-known form of pressure mechanism capable of producing the desired effects, said pressure mechanism being the ordinary type of hydraulic mechanism—shown, for instance, in the patent to Howard, No. 21,340, and dated August 31, 1858. This pressure mechanism simply consists of the pressure-cylinders 29, arranged within opposite ends of the frame 1, and the pistons 30, moving within the cylinders and mounted on one end of the piston-rods 31, sliding through the stuffing-boxes 32 at the inner ends of the cylinders and connected at their inner ends to the cross-bars 17 of the yokes 16 at a central point between the ends of such crossbars. In addition to the cylinders and pistons therein the said pressure mechanism includes a fluid-supply pipe 34, connected with the outer end of each pressure-cylinder and fitted with an ordinary type of pressure-regulating valve 35, which may be adjusted so as to open at any desired pressure, and thus secure the pressure upon the growing bale. In this old and well-known type of pressure mechanism the pressure-regulating valve is opened when it is desired to resupply the pressure liquid, so as to readjust the movable roll to its initial position. As the action of the pressure mechanism described is well understood in the art, further description thereof is deemed unnecessary.

Adapted to be removably and replaceably arranged between each of the movable or negative rolls 14 and the central fixed roll 5 is a core-rod 48. The core-rod 48 is spirally grooved nearly its entire length and is provided with reduced spindle extremities 49, on which extremities are fitted the disk-heads 50, which form guards for the ends of the bale which is formed around the core-rod, and one of the reduced spindle extremities 49 of the core-rod is threaded to removably receive thereon one of said disk-heads 50 in order that the rod may be readily withdrawn from the complete bale. The core-rods 48 are inserted in place between the rolls 14 and the roll 5 by passing the tip ends of the spindle extremities of such rods, which project beyond the heads 50 through the clearance-spaces 20 of the yoke-plates 18 and into the core-supporting slots 19, leading into said clearance-spaces, and said spaces also allow the cores to drop out of the roll-carrying yokes when the rolls 14 have reached a point farthest from the central fixed roll 5.

The bat of cotton is fed to either side of the central fixed roll 5 through a swinging feed-chute 52, which is pivotally swung between a pair of supporting-uprights 53 at opposite sides of the frame 1 and is arranged to work directly over the central fixed roll 5. An adjusting-rod 54 is pivotally connected at one end to the feed-chute 52 at a point above its pivot to provide for swinging said chute to an inclined position, so as to dispose its lower end at either side of the vertical center of the roll 5, whereby the cotton delivered into the chute from the condenser will be evenly fed to the core between one of the movable or negative rolls 14 and the central fixed roll 5. While the condenser (designated by 100) constitutes a single bat-forming apparatus to deliver the bat to the feed-chute, still as the same is of any ordinary type it has only been deemed necessary to diagrammatically illustrate it in the drawings.

In starting the press the parts are so adjusted that one of the rolls 14 is disposed directly adjacent to the central fixed roll 5, and a core-rod 48 is inserted in place between these two rolls in the manner already described. As thus positioned, the movable roll will be held in direct contact with the core-rod 48, and the rotation of both rolls in the same direction will provide for the frictional rotation of the core-rod in an opposite direction, so that as the bat of cotton is fed between the fixed roll and the directly adjacent movable roll 14 the cotton will be tightly wrapped around the rotating core-rod and will continue to wrap therearound to form a compact cylindrical or roll bale of a constantly-increasing size as the movable roll separates away from the fixed roll. It will be understood that during the formation of the roll bale at one side of the fixed roll the movable roll at the opposite side of said fixed roll is not in operation, but is caused to approach the fixed roll. As the bat of cotton accumulates on the core-rod the movable pressure-roll 14, bearing against said bat of cotton, is gradually forced thereby away from the fixed roll; but the tendency of the said movable roll to separate or move away from the fixed roll is resisted with great pressure by the water or other liquid within the adjacent pressure-cylinder, so that the movable compressing-roll 14 will always exert the desired pressure against the roll bale being formed, so that the cotton will be compressed to as great a density as may be necessary. When the bale has reached its full growth, the feed-chute 52 is swung to a position to direct the feed of cotton to the opposite side of the central roll 5, and the rotation of the movable roll previously in operation is stopped by disconnecting the clutch-collar 26 from the sprocket-wheel on the counter-shaft for such movable roll. It will also be observed that during the interval when the inactive movable roll 14 is caused to approach the central roll 5 a core-rod 48 is inserted in place, with its spindle extremities supported in the slots 19 of the yoke carrying the said inactive movable roll, so that when such movable roll reaches its forward limit of movement the clutch connection for said roll is manipulated so as to start the rotation thereof so as to initiate another bale. By reason of this operation it will be obvious that one of the rolls 14 is in action at all times, whereby one bale is always being formed within the press.

It will be understood that in the type of press described after a bale has reached its full growth and the rotation of the movable roll thereagainst is stopped by operating the clutch for such roll the direction of rotation of all the parts of the machine should be reversed at the time the feed-chute is swung to a position to direct the bat to the opposite side of the central roll. This may be accomplished in any well-known way, but preferably by reversing the engine or other power having the driving connection with the pulley 13.

When a completed roll bale has been dropped from the press in the manner described, the removable disk-head 50, carried by the core-rod within such bale, is removed from the threaded extremity of such core-rod, which core-rod can be then readily unscrewed out of the completed bale, it being noted that the spiral grooving of the core-rods provides for a screw action to facilitate the ready withdrawal thereof from the completed bale.

From the foregoing it is thought that the construction, operation, and many advantages of the herein-described cotton-compress will be understood by those skilled in the art without further description, and it will be further understood that changes in the form, proportion, and minor details of construction may be resorted to without departing from the principle or sacrificing any of the advantages of this invention.

What I claim is—

1. The combination with a single bat-forming apparatus, of two sets of rotary cotton-pressing appliances, and means for feeding the bat to either of said appliances, and for shifting the feed from either one to the other, whereby the process of forming the bale in either one may go on while a previously-finished bale is being removed from the other.

2. The combination with a bat-forming apparatus, of two sets of rotary cotton-pressing appliances, and a feed-chute arranged to deliver the bat to either of the said appliances.

3. The combination with a bat-forming apparatus, of two sets of rotary cotton-compressing appliances, a movable feed-chute arranged to deliver the bat to either of said appliances, and means for shifting the position of said chute.

4. The combination with a bat-forming apparatus, of two sets of rotary cotton-pressing appliances, a swinging feed-chute pivotally supported and arranged to deliver the bat to either of said appliances, and means for shifting the position of said chute.

5. The combination with a bat-forming apparatus, of two sets of rotary cotton-pressing appliances, a swinging feed-chute pivotally supported in a plane above and centrally between the two appliances and adapted to deliver the bat to either of the same, and means for shifting the chute.

In testimony that I claim the foregoing as my own I have hereto affixed my signature in the presence of two witnesses.

THOMAS J. GRIFFIN.

Witnesses:
JOHN H. SIGGERS,
HAROLD H. SIMMS.